United States Patent
Georgios et al.

(10) Patent No.: US 10,686,672 B2
(45) Date of Patent: Jun. 16, 2020

(54) METHOD FOR GENERATING ROUTING CONTROL ACTION IN SOFTWARE-DEFINED NETWORK AND RELATED DEVICE

(71) Applicant: HUAWEI TECHNOLOGIES CO., LTD., Shenzhen, Guangdong (CN)

(72) Inventors: Trimponias Georgios, Hong Kong (CN); Zhitang Chen, Shenzhen (CN); Yanhui Geng, Montreal (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/226,577

(22) Filed: Dec. 19, 2018

(65) Prior Publication Data

US 2019/0123974 A1  Apr. 25, 2019

Related U.S. Application Data

(63) Continuation of application No. PCT/CN2017/087921, filed on Jun. 12, 2017.

(30) Foreign Application Priority Data

Jun. 23, 2016 (CN) .......................... 2016 1 0465236

(51) Int. Cl.
*G06F 15/16* (2006.01)
*H04L 12/24* (2006.01)
(Continued)

(52) U.S. Cl.
CPC .......... *H04L 41/16* (2013.01); *G06N 3/0445* (2013.01); *G06N 3/0454* (2013.01); *G06N 3/084* (2013.01);
(Continued)

(58) Field of Classification Search
CPC .......... H04L 45/16; H04L 41/16; H04L 45/64
See application file for complete search history.

(56) References Cited

U.S. PATENT DOCUMENTS 7,370,096 B2 * 5/2008 Gous .................. H04L 41/0813
709/221
9,780,909 B2 * 10/2017 Wood .................. H04J 14/0286
(Continued)

FOREIGN PATENT DOCUMENTS

| CN | 102571570 A | 7/2012 |
| CN | 103051629 A | 4/2013 |

(Continued)

OTHER PUBLICATIONS

Justin A. Boyan et al, Packet routing in dynamically changing networks: a reinforcement learning approach. NIPS"93 Proceedings of the 6th International Conference on Neural Information Processing Systems, Nov. 29-Dec. 2, 1993 , 8 pages.

*Primary Examiner* — Hieu T Hoang
(74) *Attorney, Agent, or Firm* — Womble Bond Dickinson (US) LLP

(57) ABSTRACT

Embodiments of this application provide a method for generating a routing control action in a software-defined network and a related device, to provide optimum control actions for the SDN. The method includes: obtaining a current network state parameter of the SDN; determining a Q function of the SDN based on the current network state parameter of the SDN and a deep neural network model, where the deep neural network model is determined based on a current topology structure of the SDN; and determining a routing control action for the SDN based on the Q function and a link state parameter of each link in the SDN. In the technical solution, the deep neural network model is combined with a Q-learning algorithm of reinforcement learning, and optimum control actions can be determined.

20 Claims, 6 Drawing Sheets

(51) Int. Cl.
  *G06N 3/04*    (2006.01)
  *G06N 3/08*    (2006.01)
  *H04L 12/715*  (2013.01)
  *H04L 12/751*  (2013.01)
  *H04L 12/26*   (2006.01)
  *H04L 12/761*  (2013.01)

(52) U.S. Cl.
  CPC .............. H04L 45/02 (2013.01); H04L 45/64 (2013.01); *H04L 41/12* (2013.01); *H04L 43/0882* (2013.01); *H04L 45/16* (2013.01)

(56) References Cited

U.S. PATENT DOCUMENTS

| | | | |
|---|---|---|---|
| 2012/0030150 A1* | 2/2012 | McAuley | H04L 45/02 706/12 |
| 2013/0332399 A1* | 12/2013 | Reddy | H04L 41/147 706/12 |
| 2015/0195126 A1* | 7/2015 | Vasseur | H04L 41/5025 370/218 |
| 2015/0195178 A1* | 7/2015 | Bhattacharya | H04L 45/745 718/1 |
| 2015/0295856 A1* | 10/2015 | Karthikeyan | H04L 65/80 370/230 |
| 2016/0218949 A1* | 7/2016 | Dasgupta | H04L 63/1416 |
| 2016/0294675 A1 | 10/2016 | Ji et al. | |
| 2017/0019302 A1* | 1/2017 | Lapiotis | H04L 41/0813 |
| 2018/0123724 A1* | 5/2018 | Zhang | H04J 14/0212 |

FOREIGN PATENT DOCUMENTS

| | | |
|---|---|---|
| CN | 104579961 A | 4/2015 |
| CN | 105490962 A | 4/2016 |
| CN | 105553863 A | 5/2016 |
| EP | 2765751 B1 | 6/2017 |
| WO | 2015089706 A1 | 6/2015 |

\* cited by examiner

METHOD FOR GENERATING ROUTING CONTROL ACTION IN SOFTWARE-DEFINED NETWORK AND RELATED DEVICE

CROSS-REFERENCE TO RELATED APPLICATIONS

This application is a continuation of International Application No. PCT/CN2017/087921, filed on Jun. 12, 2017, which claims priority to Chinese Patent Application No. 201610465236.1, filed on Jun. 23, 2016, The disclosures of the aforementioned applications are hereby incorporated by reference in their entireties.

TECHNICAL FIELD

Embodiments of this application relate to the field of information technologies, and more specifically, to a method for generating a routing control action in a software-defined network, and a related device.

BACKGROUND

Network routing algorithms in the prior art are based on a fixed network topology structure. In these network routing algorithms in the prior art, real-time network traffic distribution is not considered. Typical network routing algorithms in the prior art include shortest path routing, equal-cost multi-path routing, and the like. Because real-time network traffic distribution is not considered, load balancing is difficult to implement by using the network routing algorithms in the prior art, and network congestion tend to occur. In addition, the network routing algorithms in the prior art have poor adaptability. When the network topology structure changes, routing needs to be set again manually based on a new network topology structure.

In a software-defined network (SDN), the OpenFlow technology is used for an SDN switch and an SDN controller to jointly complete a forwarding process that is entirely controlled by a switch/router originally, to separate data forwarding and routing control. Due to the separation of data forwarding and routing control, an SDN switch forwarding table can be configured by the controller, so that dynamic updating can be implemented. The controller has a capability of monitoring global information. Therefore, the foregoing feature of the SDN can be utilized to design a routing control policy, so that optimum control actions are provided for the SDN.

SUMMARY

Embodiments of this application provide a method for generating a routing control action in a software-defined network and a related device, to provide optimum control actions for the SDN.

According to a first aspect, an embodiment of this application provides a method for generating a routing control action in an SDN. The method includes: obtaining a current network state parameter of the SDN, where the current network state parameter of the SDN includes one or more of the following: current maximum link utilization of the SDN, current maximum link fair-share of the SDN, a current negative normalized flow completion time of the SDN, or a current negative maximum number of active elephant flows over all links of the SDN; determining a Q function of the SDN based on the current network state parameter of the SDN and a deep neural network model, where the deep neural network model is determined based on a current topology structure of the SDN; and determining a routing control action for the SDN based on the Q function and a link state parameter of each link in the SDN, where the link state parameter includes one or more of the following: link utilization, link fair-share, switch queue sizes, or an active flows remaining size per link. In the technical solution, the network state parameter used to determine the Q function can reflect information such as a congestion level and the queue sizes. Therefore, a routing control action that can be generated by using the determined Q function is better. In addition, the deep neural network can be used to extract and abstract wanted information from original network state data layer by layer. In conclusion, combining the deep neural network model with a Q-learning algorithm of reinforcement learning can determine optimum control actions.

In one embodiment, before the determining a Q function of the SDN based on the current network state parameter of the SDN and a deep neural network model, the method further includes: obtaining the current topology structure of the SDN; and determining the deep neural network model based on the current topology structure of the SDN. In the technical solution, the deep neural network model is determined based on the current topology structure of the SDN. To be specific, when the SDN structure changes, the deep neural network model may be updated in accordance with a change of the SDN structure, and updated optimum control actions corresponding to different link state parameters and an updated Q function are determined by using an updated deep neural network model. Therefore, the technical solution produces an effect of adaptive robust control.

In one embodiment, the obtaining the topology structure of the SDN includes: obtaining a layer quantity N of the SDN, a network element quantity of the SDN, a connection relationship between network elements in the SDN, and symmetry of a connection structure at each layer of the SDN, where N is a positive integer greater than or equal to 2; and the determining the deep neural network model based on the topology structure of the SDN includes: determining a hidden layer quantity of the deep neural network model based on the layer quantity N of the SDN; determining a quantity and types of neurons in the deep neural network model based on the network element quantity of the SDN, the connection relationship between network elements in the SDN, and the link state parameter of each link in the SDN; determining a connection structure of two adjacent layers in the deep neural network model based on the connection relationship between network elements in the SDN; and determining symmetry of connection weights of the deep neural network model based on the symmetry of the connection structure at each layer of the SDN. In the technical solution, the topology structure of the SDN and the connection relationship between the links are considered during determining of the deep neural network model.

In one embodiment, the determining a quantity and types of neurons in the deep neural network model based on the network element quantity of the SDN, the connection relationship between network elements in the SDN, and the link state parameter of each link in the SDN includes: determining a quantity and types of neurons at an input layer in the deep neural network model based on the network element quantity of the SDN and the link state parameter of each link in the SDN, where the neurons at the input layer include at least one state neuron, at least one source neuron, at least one destination neuron, and at least one intermediate neuron, each state neuron is corresponding to each link state parameter of each link, each source neuron is corresponding to each edge switch for entering the SDN, each destination neuron is corresponding to each edge switch for leaving the SDN, and each intermediate neuron is corresponding to an intermediate forwarding switch selected by each routing control action; and determining a quantity and types of neurons at hidden layers in the deep neural network model based on the connection relationship between network elements in the SDN and the link state parameter of each link in the SDN, where a first layer of the hidden layers includes $m_1$ autocorrelation structures corresponding to $m_1$ links and a neuron corresponding to a switch at a second layer of the SDN, the $m_1$ links are links between a first layer and the second layer of the SDN, each of the $m_1$ autocorrelation structures includes a plurality of neurons, and $m_1$ is a positive integer; an $N^{th}$ layer of the hidden layers includes the at least one destination neuron; and if N is a positive integer greater than 2, a $k^{th}$ layer of the hidden layers further includes $m_k$ autocorrelation structures corresponding to $m_k$ links and neurons corresponding to switches at a $k^{th}$ layer and a $(k+1)^{th}$ layer of the SDN, where the $m_k$ links are links between the $k^{th}$ layer and the $(k+1)^{th}$ layer of the SDN, each of the $m_k$ autocorrelation structures includes a plurality of neurons, k is a positive integer that is greater than or equal to 2 and less than or equal to N–1, and $m_k$ is a positive integer. With this technical solution, a deep neural network model with a same hierarchical structure can be constructed based on a physical network hierarchical structure of an SDN.

In one embodiment, the determining a connection structure of two adjacent layers in the deep neural network model based on the connection relationship between network elements in the SDN includes: determining, based on the connection relationship between network elements in the SDN, a correspondence between neurons corresponding to each autocorrelation structure at the hidden layers and neurons corresponding to switches at the hidden layers; and determining that each autocorrelation structure at the hidden layers is connected to corresponding neurons at the input layer, where a first neuron that is at a second layer of the hidden layers and that is corresponding to a first switch at the second layer of the SDN is connected to a corresponding autocorrelation structure at the first layer of the hidden layers and a neuron that is at the first layer of the hidden layers and that is corresponding to the first switch, and the first switch is any switch at the second layer of the SDN; and if N is a positive integer greater than 2, a second neuron that is at a $(k+1)^{th}$ layer of the hidden layers and that is corresponding to a second switch at the $(k+1)^{th}$ layer of the SDN is connected to a corresponding autocorrelation structure at a $k^{th}$ layer of the hidden layers, a neuron that is at the $k^{th}$ layer of the hidden layers and that is corresponding to the second switch, and a neuron that is at the $k^{th}$ layer of the hidden layers and that is corresponding to the second neuron, and the second switch is any switch at an $n^{th}$ layer of the SDN. With this technical solution, a deep neural network model with same connection characteristics can be constructed based on physical network connection characteristics of an SDN.

In one embodiment, the determining symmetry of connection weights of the deep neural network model based on the symmetry of the connection structure at each layer of the SDN includes: determining symmetry of a connection weight at each layer of the hidden layers in the deep neural network model based on the symmetry of the connection structure at each layer of the SDN, where a weight of any autocorrelation structure at the hidden layers is a connection weight of a layer to which the any autocorrelation structure belongs. In the technical solution, a weight sharing mechanism is used based on structure symmetry of a physical network, so that parameter search space of the neural network is greatly reduced, and a learning speed of the deep neural network model is increased.

In one embodiment, the determining a Q function based on the current network state parameter and a deep neural network model that is determined based on the current topology structure of the SDN includes: determining the Q function by using the following formula:

$$Q(s,a) \leftarrow Q(s,a) + \eta[R(s,a) + \gamma \max_{a'} Q(s',a') - Q(s,a)],$$

where

R(s,a) is a feedback on a case in which a control action a is applied upon a state s of the SDN; $\eta$ represents a reinforcement learning speed, and $\gamma$ is a discount constant; and Q(s,a) represents a feedback on a case in which the control action a is selected upon the state s of the SDN, and Q(s',a') represents a feedback on a case in which a control action a' is selected upon a state s' of the SDN.

According to a second aspect, an embodiment of this application further provides a device for generating a routing control action in an SDN. The device includes units that perform the steps in the first aspect or various possible implementations of the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Figure 1:
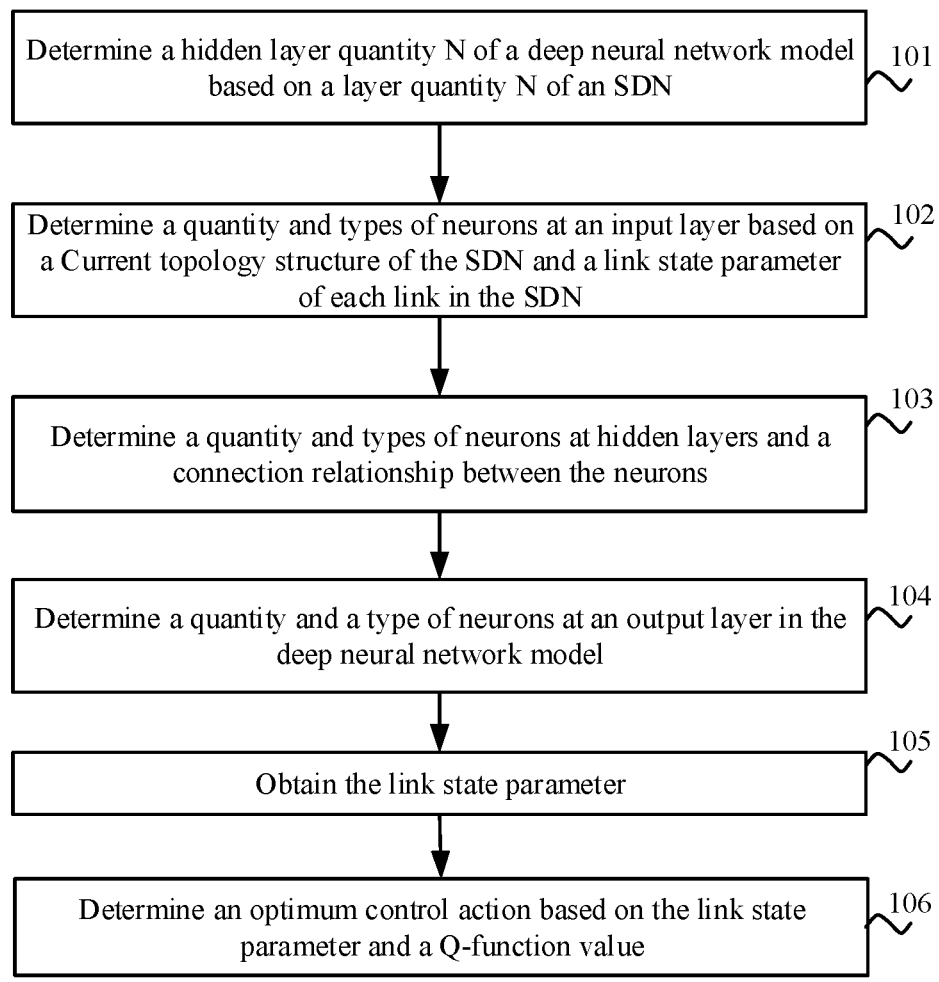
FIG. 1 is a schematic flowchart of generating a routing control action in an SDN according to an embodiment of this application.

FIG. 1 is a schematic flowchart of generating a routing control action in an SDN according to an embodiment of this application.

Operation 101. Determine a hidden layer quantity N of a deep neural network model based on a layer quantity N of an SDN, where the SDN is an SDN with a multi-layer topology structure.

In addition to the hidden layers, the deep neural network model includes an input layer and an output layer.

Operation 102. Determine a quantity and types of neurons at an input layer based on a current topology structure of the SDN and a link state parameter of each link in the SDN.

In one embodiment, the link state parameter may include one or more of the following: link utilization, link fair-share, switch queue sizes, or an active flows remaining size per link. Based on the topology structure of the SDN, an edge switch for entering the SDN, an edge switch for leaving the SDN, and an intermediate forwarding switch through which data in the SDN passes can be determined.

Neurons at the input layer in the deep neural network model include a neuron corresponding to the link state parameter (referred to as a state neuron hereinafter), a neuron corresponding to the edge switch for entering the SDN (referred to as a source neuron hereafter), a neuron corresponding to the edge switch for leaving the SDN (referred to as a destination neuron hereafter), and an SDN neuron corresponding to the intermediate forwarding switch (referred to as an intermediate neuron hereinafter). Each state neuron is corresponding to each link state parameter of each link. Each source neuron is corresponding to each edge switch for entering the SDN. Each destination neuron is corresponding to each edge switch for leaving the SDN. Each intermediate neuron is corresponding to each intermediate forwarding switch in the SDN.

Operation 103. Determine a quantity and types of neurons at hidden layers and a connection relationship between the neurons.

Neurons at a first layer of the hidden layers are determined. The first layer of the hidden layers includes $m_1$ autocorrelation structures corresponding to $m_1$ links and a neuron corresponding to a switch at a second layer of the SDN. The $m_1$ links are links between a first layer and the second layer of the SDN. Each of the $m_1$ autocorrelation structures includes a plurality of neurons, and $m_1$ is a positive integer. The autocorrelation structure is a small-sized neural network. An input layer of the small-sized neural network may have a plurality of input neurons. For example, there may be three input neurons. The three input neurons are corresponding to output of a state neuron of a link and two output neurons corresponding to the link, respectively. It may be understood that a link is a path for data transmission between two switches. Therefore, each link includes two endpoints. These two endpoints are two switches. Each of the two switches is corresponding to one neuron. Neurons corresponding to the link are two neurons corresponding to these two endpoint switches. An output layer of the small-sized neural network has only one neuron. A quantity of hidden layers of the small-sized neural network may be self-defined. However, there are usually few hidden layers. For example, there may be two or three hidden layers. Layers of the small-sized neural network may be fully connected. That is, all neurons at an upper layer are connected to all neurons at a lower layer. Neurons corresponding to an autocorrelation structure may include three neurons corresponding to an input layer of the autocorrelation structure, that is, a state neuron of a link and two neurons corresponding to the link. Therefore, the autocorrelation structure may be referred to as an autocorrelation structure corresponding to the link.

A neuron at an $N^{th}$ layer of the hidden layers is determined. The neuron at the $N^{th}$ layer of the hidden layers includes at least one destination neuron.

If N is a positive integer greater than 2, neurons at a $k^{th}$ layer of the hidden layers are determined. The $k^{th}$ layer of the hidden layers includes $m_k$ autocorrelation structures corresponding to $m_k$ links and neurons corresponding to switches at a $k^{th}$ layer and a $(k+1)^{th}$ layer of the SDN. The $m_k$ links are links between the $k^{th}$ layer and the $(k+1)^{th}$ layer of the SDN. Similar to the first layer of the hidden layers, the autocorrelation structure is also a small-sized neural network including a plurality of neurons. For a specific description, reference may be made to the description of the first layer of the hidden layers, and details are not described herein again. k is a positive integer that is greater than or equal to 2 and less than or equal to N−1, and $m_k$ is a positive integer.

After the neurons are determined, the connection relationship between the neurons in the deep neural network model may also be determined.

In one embodiment, the connection relationship between neurons corresponding to each autocorrelation structure at the hidden layers and neurons corresponding to switches at the hidden layers may be determined based on a connection relationship between network elements in the SDN. For example, neurons corresponding to an autocorrelation structure corresponding to a link L13 from a switch S1 to a switch S3 are a state neuron corresponding to the link L13, a neuron corresponding to the switch S1, and a neuron corresponding to the switch S3. It is assumed that there is a link between the switch S3 and the switch S1 and a link between the switch S3 and a switch S5. In this case, neurons corresponding to the neuron corresponding to the switch S3 include the neuron corresponding to the switch S1 and a neuron corresponding to the switch S5.

Each autocorrelation structure at the hidden layers is connected to corresponding neurons at the input layer.

Each neuron that is at a second layer of the hidden layers and that is corresponding to each switch at the second layer of the SDN is connected to a corresponding autocorrelation structure at the first layer of the hidden layers and a neuron that is at the first layer of the hidden layers and that is corresponding to the switch.

For example, it is assumed that a neuron 3 is a neuron that is at the second layer of the hidden layers and that is corresponding to the switch S3, the link L13 exists between the switch S3 and the switch S1, the switch S1 is a switch at the first layer of the SDN, and the switch S3 is a switch at the second layer of the SDN. In this case, the neuron 3 is connected to an autocorrelation structure that is at the first layer of the hidden layers and that is corresponding to the link L13, and is connected to a neuron that is at the first layer of the hidden layers and that is corresponding to the switch S3.

If N is a positive integer greater than 2, each neuron that is at a $(k+1)^{th}$ layer of the hidden layers and that is corresponding to each switch at the $(k+1)^{th}$ layer of the SDN is connected to a corresponding autocorrelation structure at a $k^{th}$ layer of the hidden layers, a neuron that is at the $k^{th}$ layer of the hidden layers and that is corresponding to the switch, and a neuron that is at the $k^{th}$ layer of the hidden layers and that is corresponding to the neuron.

For example, it is assumed that a neuron 5 is a neuron that is at a third layer of the hidden layers and that is corresponding to the switch S5, a link L35 exists between the switch S5 and the switch S3, the switch S3 is a switch at the second layer of the SDN, and the switch S5 is a switch at a third layer of the SDN. In this case, the neuron 5 is connected to an autocorrelation structure that is at the second layer of the hidden layers and that is corresponding to the link L35, and is connected to a neuron that is at the second layer of the hidden layers and that is corresponding to the switch S3 and a neuron that is at the second layer of the hidden layers and that is corresponding to the switch S5.

Further, connection weights of all autocorrelation structures at a same layer of the hidden layers are the same. The connection weight may be obtained through reinforcement learning. Different connection weights are used for autocorrelation structures at different layers.

Operation 104. Determine a quantity and a type of neurons at an output layer in the deep neural network model.

The neuron at the output layer includes one neuron. This neuron is connected to a neuron at an $N^{th}$ layer of the hidden layers in the deep neural network model. The neuron at the output layer outputs a Q-function value.

An initial routing rule of the SDN may be preset, for example, a random routing rule. If a switch is affirmatively in an active state (that is, data is input to or output from the switch), a neuron corresponding to the switch may obtain an affirmative output signal. The affirmative output signal may be any real number, and is not limited in this application. Correspondingly, if a switch is negatively in an active state (that is, no data is input to or output from the switch), a neuron corresponding to the switch may obtain a negative output signal. The negative output signal may be a real number different from the affirmation output signal, and is not limited in this application. The active state of the switch and a link state parameter of a link corresponding to the switch may be used as a state s during a Q-learning process. A current network state parameter generated during a data transmission process may be used as a feedback during the Q-learning process.

The Q-learning process may be implemented by using the following formula:

$$Q(s,a) \leftarrow Q(s,a) + \eta[R(s,a) + \gamma \max_{a'} Q(s',a') - Q(s,a)]$$ (formula 1.1), where R(s,a) is a feedback on a case in which a control action a is applied upon a state s of the SDN; η represents a reinforcement learning speed, and γ is a discount constant; and Q(s,a) is an action-value function estimate representing a feedback on a case in which the control action a is selected upon the state s of the SDN, and similarly $Q(s',a')$ represents a feedback on a case in which a control action a' is selected upon a state s' of the SDN. The feedback is the detected current network state parameter generated during the data transmission process. η and γ may be preset. R(s,a) is obtained through calculation based on network performance after network control is applied.

Q-function values corresponding to different control actions in different states s may be obtained by using the foregoing Q-learning process. Afterwards, weights of the deep neural network model may be trained by using gradient descent and back propagation approaches, to make a minimum difference between the Q-function value and a target Q-function value.

In this way, an optimum control action can be determined based on the obtained Q-function value.

Optionally, when the topology structure of the SDN changes, step 101 to step 104 may be repeated to determine an updated deep neural network model.

After the Q-function value is determined, the optimum control action may be determined by using the Q-function value. Specifically, this may be implemented in operation 105 and operation 106.

Operation 105. Obtain the link state parameter.

Operation 106. Determine an optimum control action based on the link state parameter and a Q-function value.

With the technical solution shown in FIG. 1, a deep neural network model with a same hierarchical structure and same connection structures can be constructed based on a physical network hierarchical structure and connection characteristics of an SDN. In addition, a weight sharing mechanism is used based on structure symmetry of a physical network, so that parameter search space of the deep neural network model is greatly reduced, and a learning speed is increased. In addition, the deep neural network model can be used to extract and abstract wanted information from original network state data layer by layer. Combining a deep neural network model having the foregoing characteristics with a Q-learning algorithm of reinforcement learning can determine optimum control actions. Moreover, the deep neural network model may be updated when the SDN structure changes. To be specific, when the SDN structure changes, the deep neural network model may be updated in accordance with a change of the SDN structure, and updated optimum control actions corresponding to different link state parameters and an updated Q function are determined by using an updated deep neural network model. Therefore, the technical solution produces an effect of adaptive robust control.

To help a person skilled in the art better understand the technical solution of this application, the technical solution of this application is further described with reference to specific embodiments. It may be understood that the specific embodiments are merely used to facilitate understanding of the technical solution of this application, but are not intended to limit the technical solution of this application.

Figure 2:
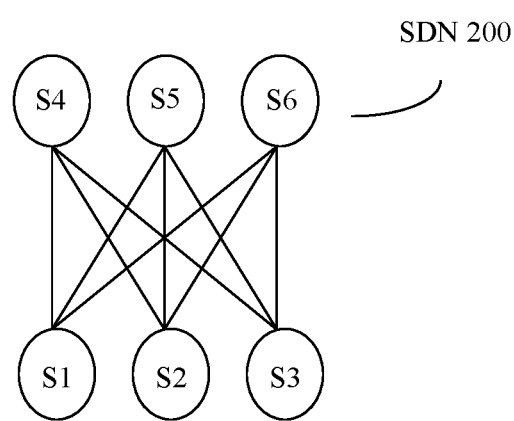
FIG. 2 is a schematic diagram of a topology structure of an SDN.

FIG. 2 is a schematic diagram of a topology structure of an SDN. The SDN 200 shown in FIG. 2 includes six switches: S1, S2, S3, S4, S5, and S6. Connection lines between the switches in the SDN 200 shown in FIG. 2 indicate connection characteristics of the switches. To be specific, the switch S4 may process data flows coming from the switches S1, S2, and S3; the switch S5 may process data flows coming from the switches S1, S2, and S3; and the switch S6 may also process data flows coming from the switches S1, S2, and S3.

In the SDN shown in FIG. 2, data may enter the SDN from the switches S1, S2, and S3, and leave the SDN from the switches S4, S5, and S6. Therefore, in the SDN shown in FIG. 2, S1 to S6 may be referred to as edge switches.

Figure 3:
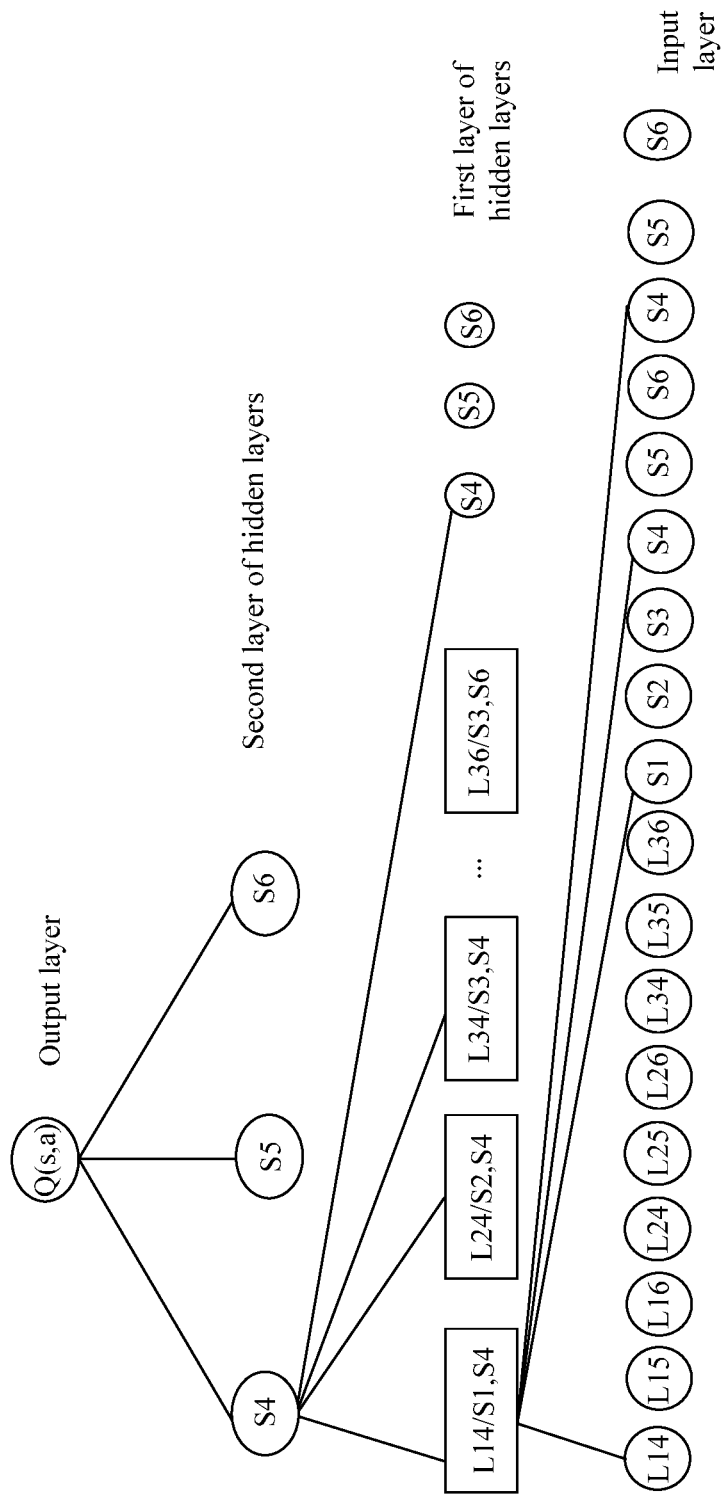
FIG. 3 is a schematic diagram of a deep neural network model corresponding to the SDN shown in FIG. 2.

A deep neural network model shown in FIG. 3 may be determined by using the method shown in FIG. 1. FIG. 3 shows a deep neural network model corresponding to the SDN shown in FIG. 2. A specific determining process is as follows.

The SDN shown in FIG. 2 includes two layers of switches, where switches at a first layer are the switches S1, S2, and S3, and switches at a second layer are S4, S5, and S6. More specifically, the switches at the first layer are edge switches for entering the SDN, and the switches at the second layer are edge switches for leaving the SDN. Therefore, the deep neural network model corresponding to the SDN includes an input layer, two hidden layers, and an output layer in total.

A neuron at the input layer may be determined based on the topology structure of the SDN and a link state parameter of each link in the SDN.

Specifically, it is assumed that the link state parameter is link utilization. In this case, it is determined that the SDN shown in FIG. 2 includes nine link state parameters in total: L14, L15, L16, L24, L25, L26, L34, L35, and L36. L14 represents link utilization of a link between the switch S1 and the switch S4, L15 represents link utilization of a link between the switch S1 and the switch S5, and so on.

The edge switches for entering the SDN are determined. The SDN shown in FIG. 2 includes three edge switches in total for entering the SDN: the switches S1, S2, and S3.

The edge switches for leaving the SDN are determined. The SDN shown in FIG. 2 includes three edge switches in total for leaving the SDN: the switches S4, S5, and S6.

Intermediate forwarding switches are determined. An intermediate forwarding switch is a next switch selected by a routing control action. In the SDN shown in FIG. 2, data may be routed to the switch S4, S5, or S6 after entering the SDN through S1, S2, or S3. Therefore, the switches S4, S5, and S6 are intermediate forwarding switches.

In conclusion, the SDN 200 includes nine link state parameters in total, and therefore, the input layer in the corresponding deep neural network model includes nine state neurons in total. The nine state neurons are in one-to-one correspondence with the nine link state parameters. The SDN 200 includes three edge switches in total for entering the SDN, and therefore, the input layer in the corresponding deep neural network model includes three source neurons in total. The three source neurons are in one-to-one correspondence with the three edge switches for entering the SDN. The SDN 200 includes three edge switches in total for leaving the SDN, and therefore, the input layer in the corresponding deep neural network model includes three destination neurons in total. The three destination neurons are in one-to-one correspondence with the three edge switches for leaving the SDN. The SDN 200 includes three intermediate forwarding switches in total, and therefore, the input layer in the corresponding deep neural network model includes three intermediate neurons in total. The three intermediate neurons are in one-to-one correspondence with the three intermediate forwarding switches. To sum up, the input layer in the deep neural network model corresponding to the SDN 200 includes 18 neurons in total.

After the neurons at the input layer are determined, neurons at a first layer of the hidden layers may be determined. Specifically, the first layer of the hidden layers includes nine autocorrelation structures. The nine autocorrelation structures are in one-to-one correspondence with nine links. For ease of description, the following La,b/Sa,Sb may be used to represent an autocorrelation structure. Therefore, the nine autocorrelation structures included in the first layer are: L14/S1,S4, L15/S1,S5, L16/S1,S6, L24/S2,S4, L25/S2,S5, L26/S2,S6, L34/S3,S4, L35/S3,S5, L36/S3,S6. L14/S1,S4 may denote that this autocorrelation structure is corresponding to the link between the switch S1 and the switch S4, and that input-layer neurons in the autocorrelation structure are corresponding to output of a state neuron corresponding to L14, a source neuron corresponding to S1, an intermediate neuron corresponding to S4, and a destination neuron corresponding to S4. L24/S2,S4 may denote that this autocorrelation structure is corresponding to a link between the switch S2 and the switch S4, and that input-layer neurons in the autocorrelation structure are corresponding to output of a state neuron corresponding to L24, a source neuron corresponding to S2, the intermediate neuron corresponding to S4, and the destination neuron corresponding to S4; and so on. Limited by a picture size, FIG. 3 shows only four of the nine autocorrelation structures. In addition to the autocorrelation structures, the first layer of the hidden layers includes neurons corresponding to the switches at the second layer of the SDN, that is, intermediate neurons, including neurons corresponding to the switches S4, S5, and S6. Each autocorrelation structure at the first layer of the hidden layers is connected to corresponding neurons. Using the autocorrelation structure L14/S1,S4 as an example, L14/S1,S4 is connected to the neuron corresponding to L14 at the input layer, the neuron corresponding to S1, and the neuron corresponding to S4.

After the first layer of the hidden layers is determined, a second layer of the hidden layers may be determined. Because the SDN 200 has only two layers, the second layer of the hidden layers includes three neurons. The three neurons are respectively corresponding to the three switches at the second layer of the SDN. Each of the three neurons is connected to the autocorrelation structures at the first layer of the hidden layers and a neuron corresponding to a corresponding intermediate forwarding switch at the first layer of the hidden layers. For example, as shown in FIG. 3, the neuron corresponding to the switch S4 is connected to L14/S1,S4, L24/S2,S4, and L34/S3,S4 at the first layer of the hidden layers and a neuron that is at the first layer of the hidden layers and that is corresponding to the switch S4.

After the neurons at the hidden layers are determined, it may be determined that all neurons at the second layer of the hidden layers are connected to one neuron at the output layer. The neuron at the output layer outputs a Q-function value.

When the topology structure of the SDN changes, the deep neural network may be updated in accordance with a changed topology structure of the SDN. For example, if the topology structure of the SDN 200 shown in FIG. 2 changes into a topology structure shown in FIG. 4, the corresponding deep neural network model may be updated to a deep neural network model shown in FIG. 5.

Figure 4:
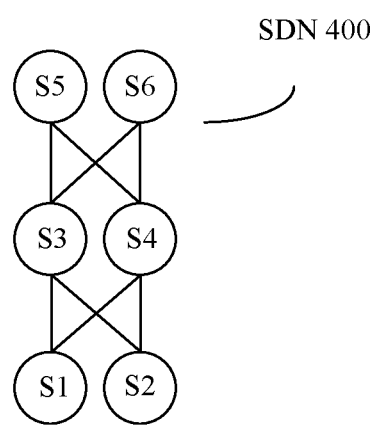
FIG. 4 is a schematic diagram of a topology structure of another SDN.
Figure 5:
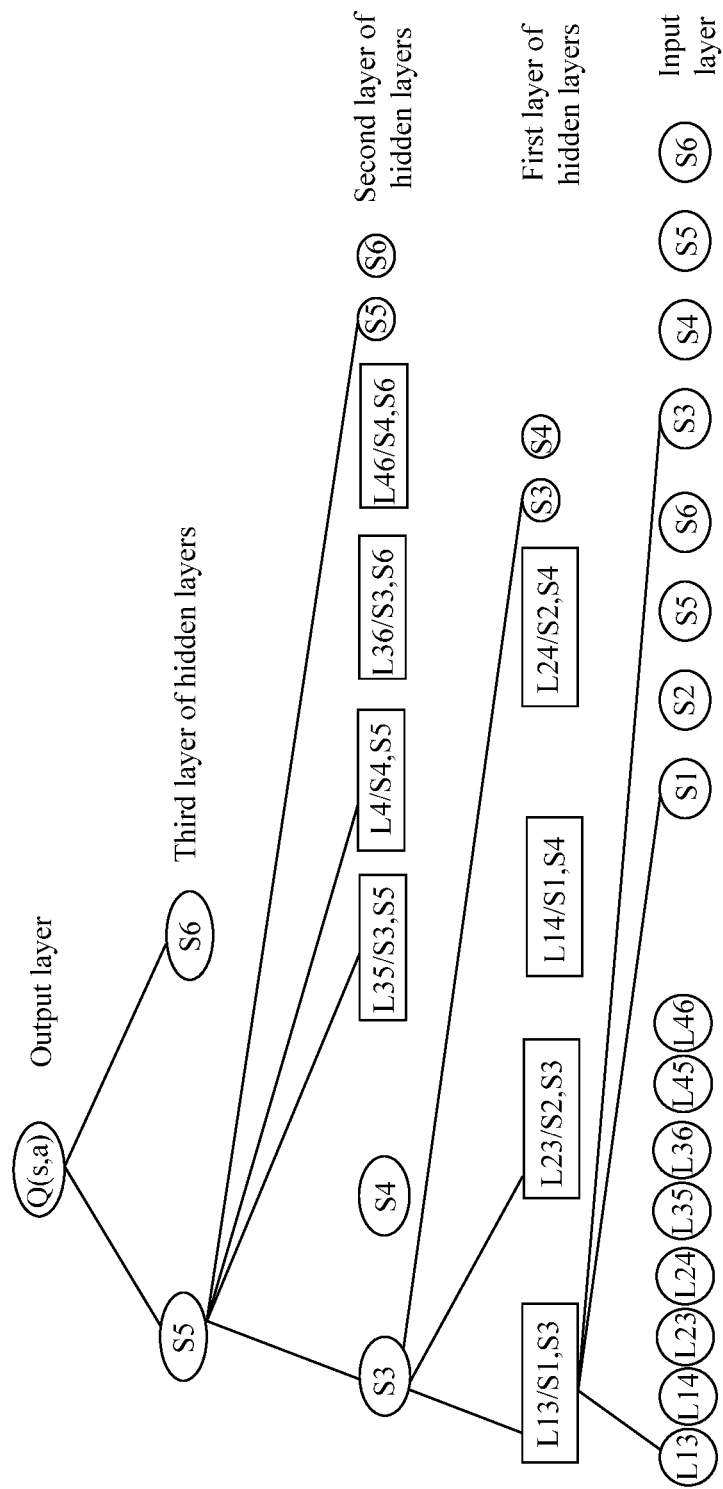
FIG. 5 is a schematic diagram of a deep neural network model corresponding to the SDN shown in FIG. 4.

An example of a process of determining the deep neural network model shown in FIG. 5 based on the SDN shown in FIG. 4 is similar to that of determining the deep neural network model shown in FIG. 3 based on the SDN shown in FIG. 2.

In one embodiment, the SDN shown in FIG. 4 includes three layers of switches. Switches at a first layer are switches S1 and S2, switches at a second layer are switches S3 and S4, and switches at a third layer are switches S5 and S6. More specifically, the switches at the first layer are edge switches for entering the SDN, and the switches at the third layer are edge switches for leaving the SDN. Therefore, the deep neural network model corresponding to the SDN includes an input layer, three hidden layers, and an output layer in total.

A neuron at the input layer may be determined based on the topology structure of the SDN and a link state parameter of each link in the SDN.

Specifically, it is assumed that the link state parameter is link utilization. In this case, it is determined that the SDN shown in FIG. 4 includes eight link state parameters in total: L13, L14, L23, L24, L35, L36, L45, and L46. L13 represents link utilization of a link between the switch S1 and the switch S3, L14 represents link utilization of a link between the switch S1 and the switch S4, and so on.

The edge switches for entering the SDN are determined. The SDN shown in FIG. 4 includes two edge switches in total for entering the SDN: the switches S1 and S2.

The edge switches for leaving the SDN are determined. The SDN shown in FIG. 4 includes two edge switches in total for leaving the SDN: the switches S5 and S6.

Intermediate forwarding switches are determined. An intermediate forwarding switch is a next switch selected by a routing control action. In the SDN shown in FIG. 4, data may be routed to S3 or S4 after entering the SDN through S1 or S2. When arriving at S3 or S4, the data continues to be routed to S5 and S6. Therefore, the SDN shown in FIG. 4 includes four intermediate forwarding switches in total: the switches S3, S4, S5, and S6.

In conclusion, the SDN 400 includes eight link state parameters in total, and therefore, the input layer in the corresponding deep neural network model includes eight state neurons in total. The eight state neurons are in one-to-one correspondence with the eight link state parameters. The SDN 400 includes two edge switches in total for entering the SDN, and therefore, the input layer in the corresponding deep neural network model includes two source neurons in total. The two source neurons are in one-to-one correspondence with the two edge switches for entering the SDN. The SDN 400 includes two edge switches in total for leaving the SDN, and therefore, the input layer in the corresponding deep neural network model includes two destination neurons in total. The two destination neurons are in one-to-one correspondence with the two edge switches for leaving the SDN. The SDN 400 includes four intermediate forwarding switches in total, and therefore, the input layer in the corresponding deep neural network model includes four intermediate neurons in total. The four intermediate neurons are in one-to-one correspondence with the four intermediate forwarding switches. To sum up, the input layer in the deep neural network model corresponding to the SDN 400 includes 16 neurons in total.

A first layer of the hidden layers includes four autocorrelation structures. The four autocorrelation structures are in one-to-one correspondence with four links from the switches at the first layer to the switches at the second layer of the SDN. For ease of description, the following La,b/Sa,Sb may be used to represent an autocorrelation structure. Therefore, the four autocorrelation structures included in the first layer of the hidden layers are: L13/S1,S3, L14/S1,S4, L23/S2,S3, and L24/S2,S4. L13/S1,S3 may denote that this autocorrelation structure is corresponding to the link between the switch S1 and the switch S3, and that input-layer neurons in the autocorrelation structure are corresponding to output of a state neuron corresponding to L13, a source neuron corresponding to S1, and an intermediate neuron corresponding to S3. L14/S1,S4 may denote that this autocorrelation structure is corresponding to the link between the switch S1 and the switch S4, and that input-layer neurons in the autocorrelation structure are corresponding to output of a state neuron corresponding to L14, the source neuron corresponding to S1, and an intermediate neuron corresponding to S4; and so on. In addition to the autocorrelation structures, the first layer of the hidden layers includes neurons corresponding to the switches at the second layer of the SDN, that is, intermediate neurons, including neurons corresponding to the switches S3 and S4. Each of the four autocorrelation structures is connected to corresponding neurons at the input layer. Using the autocorrelation structure L13/S1,S3 as an example, L13/S1,S3 is connected to the neuron corresponding to L13 at the input layer, the neuron corresponding to S1, and the neuron corresponding to S3.

A second layer of the hidden layers includes four autocorrelation structures. The four autocorrelation structures are in one-to-one correspondence with four links from the switches at the second layer to the switches at the third layer of the SDN. Therefore, the four autocorrelation structures included in the second layer of the hidden layers are: L35/S3,S5, L45/S4,S5, L36/S3,S6, and L46/S4,S6. In addition to the autocorrelation structures, the second layer of the hidden layers includes neurons corresponding to the switches at the second layer of the SDN and neurons corresponding to the switches at the third layer of the SDN. Each of the four autocorrelation structures is connected to corresponding neurons at the input layer. Using the autocorrelation structure L35/S3,S5 as an example, L35/S3,S5 is connected to a neuron corresponding to L35 at the input layer, the neuron corresponding to S3, and a neuron corresponding to S5. The neurons that are corresponding to the second-layer switches of the SDN and that are included in the second layer of the hidden layers are connected to corresponding autocorrelation structures at the first layer of the hidden layers and neurons corresponding to corresponding switches at the first layer of the hidden layers. For example, the neuron that is at the second layer of the hidden layers and that is corresponding to the switch S3 at the second layer of the SDN is connected to neurons corresponding to the autocorrelation structures L13/S1,S3 and L23/S2,S3 at the first layer of the hidden layers. In addition, the neuron 3 that is at the second layer of the hidden layers and that is corresponding to the switch S3 at the second layer of the SDN is connected to a neuron that is at the first layer of the hidden layers and that is corresponding to the switch S3.

A third layer of the hidden layers includes two neurons in total. The two neurons are neurons corresponding to destination switches, that is, the neurons corresponding to the switches S5 and S6. Each neuron at the third layer of the hidden layers is connected to a corresponding autocorrelation structure at the second layer of the hidden layers and neurons corresponding to corresponding switches. A neuron corresponding to the switch S5 is used as an example. A neuron that is at the third layer of the hidden layers and that is corresponding to the switch S5 is connected to the autocorrelation structures L35/S3,S5 and L45/S4,S5 at the second layer of the hidden layers. The neuron that is at the third layer of the hidden layers and that is corresponding to the switch S5 is also connected to neurons that are at the second layer of the hidden layers and that are corresponding to the switches S3 and S5.

After the neurons at the hidden layers are determined, it may be determined that all neurons at the third layer of the hidden layers are connected to one neuron at the output layer. The neuron at the output layer outputs a Q-function value.

Figure 6:
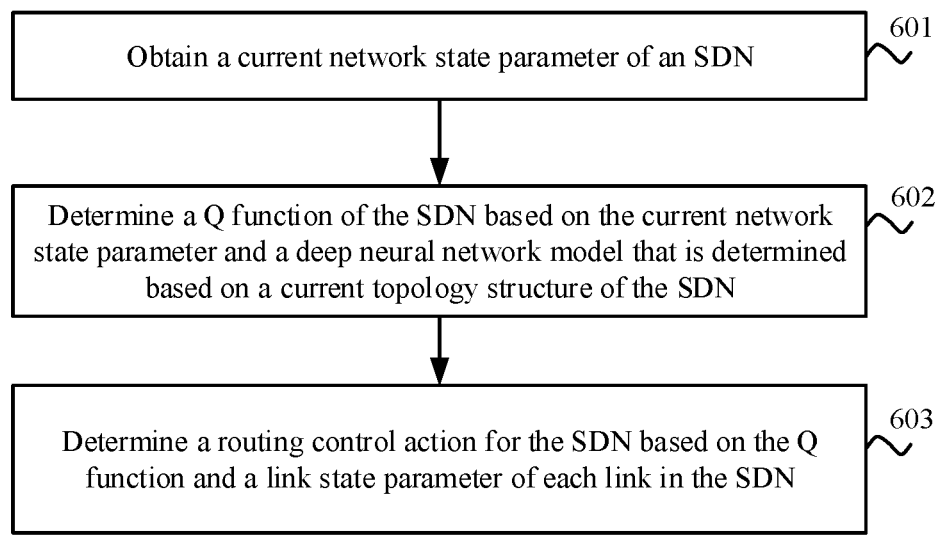
FIG. 6 is a schematic flowchart of another method for generating a routing control action in an SDN according to an embodiment of this application.

FIG. 6 is a schematic flowchart of another method for generating a routing control action in an SDN according to an embodiment of this application. The method shown in FIG. 6 may be performed by an SDN controller or a server. If the method is performed by the server, required data may be obtained through communication with the SDN controller.

Operation 601. Obtain a current network state parameter of the SDN, where the current network state parameter of the SDN includes one or more of the following: current maximum link utilization of the SDN, current maximum link fair-share of the SDN, a current negative normalized flow completion time of the SDN, and a current negative maximum number of active elephant flows over all links of the SDN.

Operation 602. Determine a Q function of the SDN based on the current network state parameter of the SDN and a deep neural network model, where the deep neural network model is determined based on a current topology structure of the SDN.

Operation 603. Determine a routing control action for the SDN based on the Q function and a link state parameter of each link in the SDN, where the link state parameter includes one or more of the following: link utilization, link fair-share, switch queue sizes, and an active flows remaining size per link.

In the technical solution shown in FIG. 6, the network state parameter used to determine the Q function can reflect information such as a congestion level and the queue sizes. Therefore, a routing control action that can be generated by using the determined Q function is better. In addition, the deep neural network model can be used to extract and abstract wanted information from original network state data layer by layer. In conclusion, combining the deep neural network model with a Q-learning algorithm of reinforcement learning can determine optimum control actions.

The link utilization is a percentage, of a bandwidth of a link, currently allocated to active data flows over the link. A counter in an SDN switch may be configured to monitor instant or average link utilization at any port in the switch. If a link is in an underused state, this state means that the link may be used to transmit data because a remaining bandwidth of the link can be fully utilized for a new data flow.

The link fair-share is defined as a quotient obtained by dividing a bandwidth B of a link by a quantity n of active data flows over the link, or may be defined as a quotient obtained by dividing the bandwidth B of a link by a quantity of active elephant flows over the link. For the former, a bandwidth that may be obtained for each data flow over the link is monitored in a fair-share model. For the latter, a bandwidth that may be obtained for each active elephant flow over the link is monitored in a fair-share model. A small link fair-share value indicates a relatively small bandwidth of the link or a relatively large quantity of active data flows over the link. In making a routing decision, a link corresponding to a large link fair-share value is preferably selected.

The switch queue size is a cache size at a port in the switch. The queue size may be easily obtained from a counter at the port in the switch. Obviously, a large queue size indicates existence of network congestion. Therefore, in making a routing decision, a small queue size is more preferred.

The active flows remaining size per link is a remaining size of all active data flows for which transmission is not yet completed over a link. A large active flows remaining size per link indicates that the link is still to be in a busy state in a coming period of time. Therefore, in making a routing decision, selecting such links should be avoided.

Maximum link utilization is maximum utilization of all links in a path after a data flow is transmitted by using the path. This definition is selected for a purpose of selecting a path, so that bandwidths of links in the path can be utilized for data flows to the utmost.

Maximum link fair-share is a maximum fair-share value of all links in a path after a data flow is transmitted by using the path. Similar to the maximum link utilization, the maximum link fair-share is selected for a purpose of selecting a path, so that available bandwidths for data flows in the path are maximum.

A negative normalized flow completion time is a quotient obtained by dividing a time for completing transmission of a data flow (inclusive of a transmission time and a delay) by a flow size of the data flow after the data flow is transmitted by using a path. Obviously, a shorter normalized flow completion time is more preferred.

A negative maximum number of active elephant flows over all links is an additive inverse of a maximum number of elephant flows over all links in a path after a data flow is transmitted by using the path. Obviously, a smaller quantity of active elephant flows in a path that is selected for a data flow is more preferred. This is because elephant flows have significant impact on network running performance.

Specifically, before the determining a Q function based on the current network state parameter of the SDN and a deep neural network model, the method further includes: obtaining the current topology structure of the SDN; and determining the deep neural network model based on the current topology structure of the SDN. In the technical solution, the deep neural network model is determined based on the current topology structure of the SDN. To be specific, when the SDN structure changes, the deep neural network model may be updated in accordance with a change of the SDN structure, and updated optimum control actions corresponding to different link state parameters and an updated Q function are determined by using an updated deep neural network model. Therefore, the technical solution produces an effect of adaptive robust control.

In one embodiment, the obtaining the topology structure of the SDN includes: obtaining a layer quantity N of the SDN, a network element quantity of the SDN, a connection relationship between network elements in the SDN, and symmetry of a connection structure at each layer of the SDN, where N is a positive integer greater than or equal to 2; and the determining the deep neural network model based on the topology structure of the SDN includes: determining a hidden layer quantity of the deep neural network model based on the layer quantity N of the SDN; determining a quantity and types of neurons in the deep neural network model based on the network element quantity of the SDN, the connection relationship between network elements in the SDN, and the link state parameter of each link in the SDN; determining a connection structure of two adjacent layers in the deep neural network model based on the connection relationship between network elements in the SDN; and determining symmetry of connection weights of the deep neural network model based on the symmetry of the connection structure at each layer of the SDN. In the technical solution, the topology structure of the SDN and the connection relationship between the links are considered during determining of the deep neural network model.

In one embodiment, the determining a quantity and types of neurons in the deep neural network model based on the network element quantity of the SDN, the connection relationship between network elements in the SDN, and the link state parameter of each link in the SDN includes: determining a quantity and types of neurons at an input layer in the deep neural network model based on the network element quantity of the SDN and the link state parameter of each link in the SDN, where the neurons at the input layer include at least one state neuron, at least one source neuron, at least one destination neuron, and at least one intermediate neuron, each state neuron is corresponding to each link state parameter of each link, each source neuron is corresponding to each edge switch for entering the SDN, each destination neuron is corresponding to each edge switch for leaving the SDN, and each intermediate neuron is corresponding to an intermediate forwarding switch selected by each routing control action; and determining a quantity and types of neurons at hidden layers in the deep neural network model based on the connection relationship between network elements in the SDN and the link state parameter of each link in the SDN, where a first layer of the hidden layers includes $m_1$ autocorrelation structures corresponding to $m_1$ links and a neuron corresponding to a switch at a second layer of the SDN, the $m_1$ links are links between a first layer and the second layer of the SDN, each of the $m_1$ autocorrelation structures includes a plurality of neurons, and $m_1$ is a positive integer; an $N^{th}$ layer of the hidden layers includes the at least one destination neuron; and if N is a positive integer greater than 2, a $k^{th}$ layer of the hidden layers further includes $m_k$ autocorrelation structures corresponding to $m_k$ links and neurons corresponding to switches at a $k^{th}$ layer and a $(k+1)^{th}$ layer of the SDN, where the $m_k$ links are links between the $k^{th}$ layer and the $(k+1)^{th}$ layer of the SDN, each of the $m_k$ autocorrelation structures includes a plurality of neurons, k is a positive integer that is greater than or equal to 2 and less than or equal to N−1, and $m_k$ is a positive integer. With this technical solution, a deep neural network model with a same hierarchical structure can be constructed based on a physical network hierarchical structure of an SDN.

In one embodiment, the determining a connection structure of two adjacent layers in the deep neural network model based on the connection relationship between network elements in the SDN includes: determining, based on the connection relationship between network elements in the SDN, a correspondence between neurons corresponding to each autocorrelation structure at the hidden layers and neurons corresponding to switches at the hidden layers; and determining that each autocorrelation structure at the hidden layers is connected to corresponding neurons at the input layer, where a first neuron that is at a second layer of the hidden layers and that is corresponding to a first switch at the second layer of the SDN is connected to a corresponding autocorrelation structure at the first layer of the hidden layers and a neuron that is at the first layer of the hidden layers and that is corresponding to the first switch, and the first switch is any switch at the second layer of the SDN; and if N is a positive integer greater than 2, a second neuron that is at a $(k+1)^{th}$ layer of the hidden layers and that is corresponding to a second switch at the $(k+1)^{th}$ layer of the SDN is connected to a corresponding autocorrelation structure at a $k^{th}$ layer of the hidden layers, a neuron that is at the $k^{th}$ layer of the hidden layers and that is corresponding to the second switch, and a neuron that is at the $k^{th}$ layer of the hidden layers and that is corresponding to the second neuron, and the second switch is any switch at an $n^{th}$ layer of the SDN. With this technical solution, a deep neural network model with same connection characteristics can be constructed based on physical network connection characteristics of an SDN.

It may be understood that each autocorrelation structure is corresponding to one link. One link includes two endpoints (that is, switches). Therefore, neurons corresponding to each autocorrelation structure include a state neuron of a link corresponding to the autocorrelation structure and two neurons corresponding to two switches of the link. It may be understood that switches at the hidden layers are endpoints of one or more links. Therefore, each switch is corresponding to at least one switch, and this corresponding switch is the other endpoint of a link in which the switch is located. Therefore, each neuron corresponding to each switch is corresponding to one or more neurons, and this corresponding neuron is a neuron corresponding to a switch corresponding to the switch. FIG. 5 is used as an example. There is a link between a switch S3 and a switch S5. Therefore, the switch S5 may be considered as a switch corresponding to the switch S3. It is assumed that a neuron corresponding to the switch S3 may be referred to as a neuron SW3 and a neuron corresponding to the switch S5 may be referred to as a neuron SW5. In this case, the neuron SW3 is corresponding to the neuron SW5. It may be understood that a correspondence between switches is consistent with a correspondence between neurons. Therefore, the switch S3 may be considered as corresponding to the switch S5, and the neuron SW5 may be considered as corresponding to the neuron SW3.

Specifically, the determining symmetry of connection weights of the deep neural network model based on the symmetry of the connection structure at each layer of the SDN includes: determining symmetry of a connection weight at each layer of the hidden layers in the deep neural network model based on the symmetry of the connection structure at each layer of the SDN, where a weight of any autocorrelation structure at the hidden layers is a connection weight of a layer to which the any autocorrelation structure belongs. In the technical solution, a weight sharing mechanism is used based on structure symmetry of a physical network, so that parameter search space of the neural network is greatly reduced, and a learning speed of the deep neural network model is increased.

Certainly, a person skilled in the art can alternatively determine the neural network model corresponding to the SDN based on the current topology structure of the SDN and other parameters.

Specifically, the determining a Q function based on the current network state parameter and a neural network model that is determined based on the current topology structure of the SDN includes: determining the Q function by using formula 1.1.

In conclusion, with this technical solution provided in this embodiment of this application, a neural network model with a same hierarchical structure and same connection structures can be constructed based on a physical network hierarchical structure and connection characteristics of an SDN. In addition, a weight sharing mechanism is used based on structure symmetry of a physical network, so that parameter search space of the deep neural network model is greatly reduced, and a learning speed is increased. In addition, the deep neural network model can be used to extract and abstract wanted information from original network state data layer by layer. Combining a deep neural network model having the foregoing characteristics with a Q-learning algorithm of reinforcement learning can determine optimum control actions. Moreover, the deep neural network model may be updated when the SDN structure changes. To be specific, when the SDN structure changes, the deep neural network model may be updated in accordance with a change of the SDN structure, and updated optimum control actions corresponding to different link state parameters and an updated Q function are determined by using an updated deep neural network model. Therefore, the technical solution produces an effect of adaptive robust control.

Figure 7:
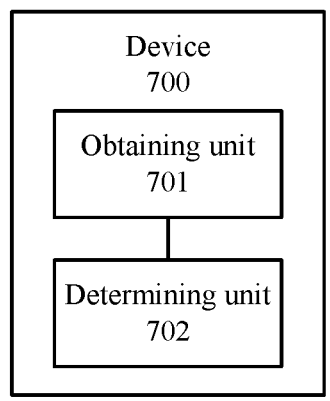
FIG. 7 is a structural block diagram of a device for generating a routing control action in an SDN according to an embodiment of this application.

FIG. 7 is a structural block diagram of a device for generating a routing control action in an SDN according to an embodiment of this application. The device 700 shown in FIG. 7 can perform the steps of the method shown in FIG. 1 or FIG. 6. The device shown in FIG. 7 may be an SDN controller or a server.

An obtaining unit 701 is configured to obtain a current network state parameter of the SDN, where the current network state parameter of the SDN includes one or more of the following: current maximum link utilization of the SDN, current maximum link fair-share of the SDN, a current negative normalized flow completion time of the SDN, and a current negative maximum number of active elephant flows over all links of the SDN.

A determining unit 702 is configured to determine a Q function of the SDN based on the current network state parameter of the SDN and a deep neural network model, where the deep neural network model is determined based on a current topology structure of the SDN.

The determining unit 702 is further configured to determine a routing control action for the SDN based on the Q function and a link state parameter of each link in the SDN, where the link state parameter includes one or more of the following: link utilization, link fair-share, switch queue sizes, and an active flows remaining size per link.

The network state parameter used by the device 700 shown in FIG. 7 to determine the Q function can reflect information such as a congestion level and the queue sizes. Therefore, a routing control action that can be generated by using the determined Q function is better. In addition, the deep neural network model can be used to extract and abstract wanted information from original network state data layer by layer. In conclusion, combining the deep neural network model with a Q-learning algorithm of reinforcement learning can determine optimum control actions.

It may be understood that if the device 700 is an SDN controller, the obtaining unit 701 may directly obtain the current network state parameter and other related parameters or information. If the device 700 is a server, the obtaining unit 701 may obtain the current network state parameter and other related parameters or information from the SDN controller.

In an embodiment, the obtaining unit 701 is further configured to obtain the current topology structure of the SDN. The determining unit 702 is further configured to determine the deep neural network model based on the current topology structure of the SDN.

In an embodiment, the obtaining unit 701 is configured to obtain a layer quantity of the SDN, a network element quantity of the SDN, a connection relationship between network elements in the SDN, and symmetry of a connection structure at each layer of the SDN, where N is a positive integer greater than or equal to 2. The determining unit 702 is specifically configured to: determine a hidden layer quantity of the deep neural network model based on the layer quantity N of the SDN; determine a quantity and types of neurons in the deep neural network model based on the network element quantity of the SDN, the connection relationship between network elements in the SDN, and the link state parameter of each link in the SDN; determine a connection structure of two adjacent layers in the deep neural network model based on the connection relationship in the SDN; and determine symmetry of connection weights of the deep neural network model based on the symmetry of the connection structure at each layer of the SDN.

In an embodiment, the determining unit 702 is configured to: determine a quantity and types of neurons at an input layer in the deep neural network model based on the network element quantity of the SDN and the link state parameter of each link in the SDN, where the neurons at the input layer include at least one state neuron, at least one source neuron, at least one destination neuron, and at least one intermediate neuron, each state neuron is corresponding to each link state parameter of each link, each source neuron is corresponding to each edge switch for entering the SDN, each destination neuron is corresponding to each edge switch for leaving the SDN, and each intermediate neuron is corresponding to an intermediate forwarding switch selected by each routing control action; and determine a quantity and types of neurons at hidden layers in the deep neural network model based on the connection relationship between network elements in the SDN and the link state parameter of each link in the SDN, where a first layer of the hidden layers includes $m_1$ autocorrelation structures corresponding to $m_1$ links and a neuron corresponding to a switch at a second layer of the SDN, the $m_1$ links are links between a first layer and the second layer of the SDN, each of the $m_1$ autocorrelation structures includes a plurality of neurons, and $m_1$ is a positive integer; an $N^{th}$ layer of the hidden layers includes the at least one destination neuron; and if N is a positive integer greater than 2, a $k^{th}$ layer of the hidden layers further includes $m_k$ autocorrelation structures corresponding to $m_k$ links and neurons corresponding to switches at a $k^{th}$ layer and a $(k+1)^{th}$ layer of the SDN, where the $m_k$ links are links between the $k^{th}$ layer and the $(k+1)^{th}$ layer of the SDN, each of the $m_k$ autocorrelation structures includes a plurality of neurons, k is a positive integer that is greater than or equal to 2 and less than or equal to N−1, and $m_k$ is a positive integer.

In an embodiment, the determining unit 702 is configured to: determine, based on the connection relationship between network elements in the SDN, a correspondence between neurons corresponding to each autocorrelation structure at the hidden layers and neurons corresponding to switches at the hidden layers; and determine that each autocorrelation structure at the hidden layers is connected to corresponding neurons at the input layer, where a first neuron that is at a second layer of the hidden layers and that is corresponding to a first switch at the second layer of the SDN is connected to a corresponding autocorrelation structure at the first layer of the hidden layers and a neuron that is at the first layer of the hidden layers and that is corresponding to the first switch, and the first switch is any switch at the second layer of the SDN; and if N is a positive integer greater than 2, a second neuron that is at a $(k+1)^{th}$ layer of the hidden layers and that is corresponding to a second switch at the $(k+1)^{th}$ layer of the SDN is connected to a corresponding autocorrelation structure at a $k^{th}$ layer of the hidden layers, a neuron that is at the $k^{th}$ layer of the hidden layers and that is corresponding to the second switch, and a neuron that is at the $k^{th}$ layer of the hidden layers and that is corresponding to the second neuron, and the second switch is any switch at an $n^{th}$ layer of the SDN.

In an embodiment, the determining unit 702 is configured to determine symmetry of a connection weight at each layer of the hidden layers in the deep neural network model based on the symmetry of the connection structure at each layer of the SDN, where a weight of any autocorrelation structure at the hidden layers is a connection weight of a layer to which the any autocorrelation structure belongs.

In an embodiment, the determining unit 702 is configured to determine the Q function by using formula 1.1.

It may be understood that for convenient and brief description, for specific working processes and technical effects of the obtaining unit 701 and the determining unit 702 in the device 700 described in FIG. 7, reference may be made to, for example, the corresponding processes and technical effects in the method embodiment in FIG. 1 or FIG. 6, and details are not described herein again.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position or distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or at least two units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium and includes several instructions for instructing a computer device (which may be a personal computer, a server, a network device, or the like) or a processor (processor) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for generating a routing control action in a software-defined network (SDN), comprising:
    obtaining a current network state parameter of the SDN having one or more of a current maximum link utilization of the SDN, a current maximum link fair-share of the SDN, a current negative normalized flow completion time of the SDN, or a current negative maximum number of active elephant flows over all links of the SDN;
    determining a Q function of the SDN based on the current network state parameter of the SDN and a deep neural network model determined based on a current topology structure of the SDN; and
    determining a routing control action for the SDN based on the Q function and a link state parameter of each link in the SDN, wherein the link state parameter comprises one or more of a link utilization, a link fair-share, switch queue sizes, or an active flows remaining size per link.

2. The method according to claim 1, wherein before the determining a Q function of the SDN based on the current network state parameter of the SDN and a deep neural network model, the method further comprises:
    obtaining the current topology structure of the SDN; and
    determining the deep neural network model based on the current topology structure of the SDN.

3. The method according to claim 2, wherein the obtaining the current topology structure of the SDN comprises: obtaining a layer quantity N of the SDN, a network element quantity of the SDN, a connection relationship between network elements in the SDN, and symmetry of a connection structure at each layer of the SDN, wherein N is a positive integer greater than or equal to 2; and
    the determining the deep neural network model based on the current topology structure of the SDN comprises:
    determining a hidden layer quantity of the deep neural network model based on the layer quantity N of the SDN;
    determining a quantity and types of neurons in the deep neural network model based on the network element quantity of the SDN, the connection relationship between network elements in the SDN, and the link state parameter of each link in the SDN;
    determining a connection structure of two adjacent layers in the deep neural network model based on the connection relationship between network elements in the SDN; and
    determining symmetry of connection weights of the deep neural network model based on the symmetry of the connection structure at each layer of the SDN.

4. The method according to claim 3, wherein the determining a quantity and types of neurons in the deep neural network model based on the network element quantity of the SDN, the connection relationship between network elements in the SDN, and the link state parameter of each link in the SDN comprises:
    determining a quantity and types of neurons at an input layer in the deep neural network model based on the network element quantity of the SDN and the link state parameter of each link in the SDN, wherein the neurons at the input layer comprise at least one state neuron, at least one source neuron, at least one destination neuron, and at least one intermediate neuron, each state neuron is corresponding to each link state parameter of each link, each source neuron is corresponding to each edge switch for entering the SDN, each destination neuron is corresponding to each edge switch for leaving the SDN, and each intermediate neuron is corresponding to an intermediate forwarding switch selected by each routing control action; and
    determining a quantity and types of neurons at hidden layers in the deep neural network model based on the connection relationship between network elements in the SDN and the link state parameter of each link in the SDN, wherein
    a first layer of the hidden layers comprises $m_1$ autocorrelation structures corresponding to $m_1$ links and a neuron corresponding to a switch at a second layer of the SDN, the $m_1$ links are links between a first layer and the second layer of the SDN, each of the $m_1$ autocorrelation structures comprises a plurality of neurons, and $m_1$ is a positive integer;

an $N^{th}$ layer of the hidden layers comprises the at least one destination neuron; and if N is a positive integer greater than 2, a $k^{th}$ layer of the hidden layers further comprises $m_k$ autocorrelation structures corresponding to $m_k$ links and neurons corresponding to switches at a $k^{th}$ layer and a $(k+1)^{th}$ layer of the SDN, wherein the $m_k$ links are links between the $k^{th}$ layer and the $(k+1)^{th}$ layer of the SDN, each of the $m_k$ autocorrelation structures comprises a plurality of neurons, k is a positive integer that is greater than or equal to 2 and less than or equal to N−1, and $m_k$ is a positive integer.

5. The method according to claim 4, wherein the determining a connection structure of two adjacent layers in the deep neural network model based on the connection relationship between network elements in the SDN comprises:

determining, based on the connection relationship between network elements in the SDN, a correspondence between neurons corresponding to each autocorrelation structure at the hidden layers and neurons corresponding to switches at the hidden layers; and determining that each autocorrelation structure at the hidden layers is connected to corresponding neurons at the input layer, wherein a first neuron that is at a second layer of the hidden layers and that is corresponding to a first switch at the second layer of the SDN is connected to a corresponding autocorrelation structure at the first layer of the hidden layers and a neuron that is at the first layer of the hidden layers and that is corresponding to the first switch, and the first switch is any switch at the second layer of the SDN; and if N is a positive integer greater than 2, a second neuron that is at a $(k+1)^{th}$ layer of the hidden layers and that is corresponding to a second switch at the $(k+1)^{th}$ layer of the SDN is connected to a corresponding autocorrelation structure at a $k^{th}$ layer of the hidden layers, a neuron that is at the $k^{th}$ layer of the hidden layers and that is corresponding to the second switch, and a neuron that is at the $k^{th}$ layer of the hidden layers and that is corresponding to the second neuron, and the second switch is any switch at an $n^{th}$ layer of the SDN.

6. The method according to claim 5, wherein the determining symmetry of connection weights of the deep neural network model based on the symmetry of the connection structure at each layer of the SDN comprises:

determining symmetry of a connection weight at each layer of the hidden layers in the deep neural network model based on the symmetry of the connection structure at each layer of the SDN, wherein a weight of any autocorrelation structure at the hidden layers is a connection weight of a layer to which the any autocorrelation structure belongs.

7. The method according to claim 1, wherein the determining a Q function based on the current network state parameter and a deep neural network model that is determined based on the current topology structure of the SDN comprises: determining the Q function by using the following formula:

$$Q(s,a) \leftarrow Q(s,a) + \eta[R(s,a) + \gamma \max_{a'} Q(s',a') - Q(s,a)],$$
wherein R(s,a) is a feedback on a case in which a control action a is applied upon a state s of the SDN; η represents a reinforcement learning speed, and γ is a discount constant; and Q(s,a) represents a feedback on a case in which the control action a is selected upon the state s of the SDN, and Q(s',a') represents a feedback on a case in which a control action a' is selected upon a state s' of the SDN.

8. A device for generating a routing control action in a software-defined network (SDN), comprising:

a processor;

a memory for storing program codes;

the processor, when executing the program codes, is configured to:

obtain a current network state parameter of the SDN having one or more of a current maximum link utilization of the SDN, a current maximum link fair-share of the SDN, a current negative normalized flow completion time of the SDN, or a current negative maximum number of active elephant flows over all links of the SDN;

determine a Q function of the SDN based on the current network state parameter of the SDN and a deep neural network model determined based on a current topology structure of the SDN; and determine a routing control action for the SDN based on the Q function and a link state parameter of each link in the SDN, wherein the link state parameter comprises one or more of a link utilization, a link fair-share, switch queue sizes, or an active flows remaining size per link.

9. The device according to claim 8, wherein the processor is further configured to obtain the current topology structure of the SDN; and determine the deep neural network model based on the current topology structure of the SDN.

10. The device according to claim 9, wherein the processor is configured to obtain a layer quantity N of the SDN, a network element quantity of the SDN, a connection relationship between network elements in the SDN, and symmetry of a connection structure at each layer of the SDN, wherein N is a positive integer greater than or equal to 2;

determine a hidden layer quantity of the deep neural network model based on the layer quantity N of the SDN;

determine a quantity and types of neurons in the deep neural network model based on the network element quantity of the SDN, the connection relationship between network elements in the SDN, and the link state parameter of each link in the SDN;

determine a connection structure of two adjacent layers in the deep neural network model based on the connection relationship between network elements in the SDN; and determine symmetry of connection weights of the deep neural network model based on the symmetry of the connection structure at each layer of the SDN.

11. The device according to claim 10, wherein the processor is configured to: determine a quantity and types of neurons at an input layer in the deep neural network model based on the network element quantity of the SDN and the link state parameter of each link in the SDN, wherein the neurons at the input layer comprise at least one state neuron, at least one source neuron, at least one destination neuron, and at least one intermediate neuron, each state neuron is corresponding to each link state parameter of each link, each source neuron is corresponding to each edge switch for entering the SDN, each destination neuron is corresponding to each edge switch for leaving the SDN, and each intermediate neuron is corresponding to an intermediate forwarding switch selected by each routing control action; and determine a quantity and types of neurons at hidden layers in the deep neural network model based on the connection relationship between network elements in the SDN and the link state parameter of each link in the SDN, wherein a first layer of the hidden layers comprises $m_1$ autocorrelation structures corresponding to $m_1$ links and a neuron corresponding to a switch at a second layer of the SDN, the $m_1$ links are links between a first layer and the second layer of the SDN, each of the $m_1$ autocorrelation structures comprises a plurality of neurons, and $m_1$ is a positive integer; an $N^{th}$ layer of the hidden layers comprises the at least one destination neuron; and if N is a positive integer greater than 2, a $k^{th}$ layer of the hidden layers further comprises $m_k$ autocorrelation structures corresponding to $m_k$ links and neurons corresponding to switches at a $k^{th}$ layer and a $(k+1)^{th}$ layer of the SDN, wherein the $m_k$ links are links between the $k^{th}$ layer and the $(k+1)^{th}$ layer of the SDN, each of the $m_k$ autocorrelation structures comprises a plurality of neurons, k is a positive integer that is greater than or equal to 2 and less than or equal to N−1, and $m_k$ is a positive integer.

12. The device according to claim 11, wherein the processor is configured to: determine, based on the connection relationship between network elements in the SDN, a correspondence between neurons corresponding to each autocorrelation structure at the hidden layers and neurons corresponding to switches at the hidden layers; and determine that each autocorrelation structure at the hidden layers is connected to corresponding neurons at the input layer, wherein a first neuron that is at a second layer of the hidden layers and that is corresponding to a first switch at the second layer of the SDN is connected to a corresponding autocorrelation structure at the first layer of the hidden layers and a neuron that is at the first layer of the hidden layers and that is corresponding to the first switch, and the first switch is any switch at the second layer of the SDN; and if N is a positive integer greater than 2, a second neuron that is at a $(k+1)^{th}$ layer of the hidden layers and that is corresponding to a second switch at the $(k+1)^{th}$ layer of the SDN is connected to a corresponding autocorrelation structure at a $k^{th}$ layer of the hidden layers, a neuron that is at the $k^{th}$ layer of the hidden layers and that is corresponding to the second switch, and a neuron that is at the $k^{th}$ layer of the hidden layers and that is corresponding to the second neuron, and the second switch is any switch at an $n^{th}$ layer of the SDN.

13. The device according to claim 12, wherein the processor is configured to determine symmetry of a connection weight at each layer of the hidden layers in the deep neural network model based on the symmetry of the connection structure at each layer of the SDN, wherein a weight of any autocorrelation structure at the hidden layers is a connection weight of a layer to which the any autocorrelation structure belongs.

14. The device according to claim 8, wherein the processor is configured to determine the Q function by using the following formula:

$$Q(s,a) \leftarrow Q(s,a) + \eta[R(s,a) + \gamma \max_{a'} Q(s',a') - Q(s,a)],$$
wherein R(s,a) is a feedback on a case in which a control action a is applied upon a state s of the SDN; η represents a reinforcement learning speed, and γ is a discount constant; and Q(s,a) represents a feedback on a case in which the control action a is selected upon the state s of the SDN, and Q(s',a') represents a feedback on a case in which a control action a' is selected upon a state s' of the SDN.

15. A non-transitory computer-readable medium having instructions stored therein, which when executed by a processor, cause the processor to perform operations of generating a routing control action in a software-defined network (SDN), the operations comprising:
obtaining a current network state parameter of the SDN having one or more of a current maximum link utilization of the SDN, a current maximum link fair-share of the SDN, a current negative normalized flow completion time of the SDN, or a current negative maximum number of active elephant flows over all links of the SDN;
determining a Q function of the SDN based on the current network state parameter of the SDN and a deep neural network model determined based on a current topology structure of the SDN; and
determining a routing control action for the SDN based on the Q function and a link state parameter of each link in the SDN, wherein the link state parameter comprises one or more of a link utilization, a link fair-share, switch queue sizes, or an active flows remaining size per link.

16. The non-transitory computer-readable medium according to claim 15, wherein before the determining a Q function of the SDN based on the current network state parameter of the SDN and a deep neural network model, the method further comprises:
obtaining the current topology structure of the SDN; and
determining the deep neural network model based on the current topology structure of the SDN.

17. The non-transitory computer-readable medium according to claim 16, wherein the obtaining the current topology structure of the SDN comprises: obtaining a layer quantity N of the SDN, a network element quantity of the SDN, a connection relationship between network elements in the SDN, and symmetry of a connection structure at each layer of the SDN, wherein N is a positive integer greater than or equal to 2; and
the determining the deep neural network model based on the current topology structure of the SDN comprises:
determining a hidden layer quantity of the deep neural network model based on the layer quantity N of the SDN;
determining a quantity and types of neurons in the deep neural network model based on the network element quantity of the SDN, the connection relationship between network elements in the SDN, and the link state parameter of each link in the SDN;
determining a connection structure of two adjacent layers in the deep neural network model based on the connection relationship between network elements in the SDN; and
determining symmetry of connection weights of the deep neural network model based on the symmetry of the connection structure at each layer of the SDN.

18. The non-transitory computer-readable medium according to claim 17, wherein the determining a quantity and types of neurons in the deep neural network model based on the network element quantity of the SDN, the connection relationship between network elements in the SDN, and the link state parameter of each link in the SDN comprises:
determining a quantity and types of neurons at an input layer in the deep neural network model based on the network element quantity of the SDN and the link state parameter of each link in the SDN, wherein the neurons at the input layer comprise at least one state neuron, at least one source neuron, at least one destination neuron, and at least one intermediate neuron, each state neuron is corresponding to each link state parameter of each link, each source neuron is corresponding to each edge switch for entering the SDN, each destination neuron is corresponding to each edge switch for leaving the SDN, and each intermediate neuron is corresponding to an intermediate forwarding switch selected by each routing control action; and determining a quantity and types of neurons at hidden layers in the deep neural network model based on the connection relationship between network elements in the SDN and the link state parameter of each link in the SDN, wherein a first layer of the hidden layers comprises $m_1$ autocorrelation structures corresponding to $m_1$ links and a neuron corresponding to a switch at a second layer of the SDN, the $m_1$ links are links between a first layer and the second layer of the SDN, each of the $m_1$ autocorrelation structures comprises a plurality of neurons, and $m_1$ is a positive integer;

an $N^{th}$ layer of the hidden layers comprises the at least one destination neuron; and if N is a positive integer greater than 2, a $k^{th}$ layer of the hidden layers further comprises $m_k$ autocorrelation structures corresponding to $m_k$ links and neurons corresponding to switches at a $k^{th}$ layer and a $(k+1)^{th}$ layer of the SDN, wherein the $m_k$ links are links between the $k^{th}$ layer and the $(k+1)^{th}$ layer of the SDN, each of the $m_k$ autocorrelation structures comprises a plurality of neurons, k is a positive integer that is greater than or equal to 2 and less than or equal to N−1, and $m_k$ is a positive integer.

19. The non-transitory computer-readable medium according to claim 18, wherein the determining a connection structure of two adjacent layers in the deep neural network model based on the connection relationship between network elements in the SDN comprises:

determining, based on the connection relationship between network elements in the SDN, a correspondence between neurons corresponding to each autocorrelation structure at the hidden layers and neurons corresponding to switches at the hidden layers; and determining that each autocorrelation structure at the hidden layers is connected to corresponding neurons at the input layer, wherein a first neuron that is at a second layer of the hidden layers and that is corresponding to a first switch at the second layer of the SDN is connected to a corresponding autocorrelation structure at the first layer of the hidden layers and a neuron that is at the first layer of the hidden layers and that is corresponding to the first switch, and the first switch is any switch at the second layer of the SDN; and if N is a positive integer greater than 2, a second neuron that is at a $(k+1)^{th}$ layer of the hidden layers and that is corresponding to a second switch at the $(k+1)^{th}$ layer of the SDN is connected to a corresponding autocorrelation structure at a $k^{th}$ layer of the hidden layers, a neuron that is at the $k^{th}$ layer of the hidden layers and that is corresponding to the second switch, and a neuron that is at the $k^{th}$ layer of the hidden layers and that is corresponding to the second neuron, and the second switch is any switch at an $n^{th}$ layer of the SDN.

20. The non-transitory computer-readable medium according to claim 19, wherein the determining symmetry of connection weights of the deep neural network model based on the symmetry of the connection structure at each layer of the SDN comprises:

determining symmetry of a connection weight at each layer of the hidden layers in the deep neural network model based on the symmetry of the connection structure at each layer of the SDN, wherein a weight of any autocorrelation structure at the hidden layers is a connection weight of a layer to which the any autocorrelation structure belongs.

\* \* \* \* \*